(12) United States Patent
Oh et al.

(10) Patent No.: US 10,809,434 B2
(45) Date of Patent: Oct. 20, 2020

(54) DISPLAY DEVICE

(71) Applicant: LG Display Co., Ltd., Seoul (KR)

(72) Inventors: JiSoon Oh, Paju-si (KR); HyeonTae Jeong, Paju-si (KR); JaeMyeong Park, Paju-si (KR); Mira Kim, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 16/564,829

(22) Filed: Sep. 9, 2019

(65) Prior Publication Data
US 2020/0192013 A1    Jun. 18, 2020

(30) Foreign Application Priority Data

Dec. 18, 2018 (KR) .................... 10-2018-0164343
Sep. 2, 2019 (KR) .................... 10-2019-0108292

(51) Int. Cl.
*G02F 1/1335* (2006.01)
*F21V 8/00* (2006.01)
*G02F 1/133* (2006.01)
*G02F 1/13357* (2006.01)

(52) U.S. Cl.
CPC ............ *G02B 6/001* (2013.01); *G02B 6/0011* (2013.01); *G02B 6/0055* (2013.01); *G02F 1/13306* (2013.01); *G02F 1/133524* (2013.01); *G02F 1/133553* (2013.01); *G02F 1/133615* (2013.01)

(58) Field of Classification Search
CPC .. G02B 27/0994; G02B 6/001; G02B 6/0008; G02B 6/0011; G02B 6/0055; G02F 1/13306; G02F 1/1335; G02F 1/133504; G02F 1/133514; G02F 1/133524; G02F 1/133553; G02F 1/1336; G02F 1/133603; G02F 1/133615
See application file for complete search history.

(56) References Cited

U.S. PATENT DOCUMENTS

2020/0174307 A1 * 6/2020 Chang ............... G02F 1/133512
2020/0192159 A1 * 6/2020 Wang .................. G02B 6/0031

* cited by examiner

*Primary Examiner* — Thoi V Duong
(74) *Attorney, Agent, or Firm* — Fenwick & West LLP (57) ABSTRACT

A display device has a camera hole in a backlight unit constituting a display unit, the backlight unit has a dark-area improvement means by providing light to a dark-area generation region of the back side of the camera hole corresponding to the opposite side where a light source is positioned, thereby improving a dark-area region, and the dark-area improvement means includes an optical fiber. The present disclosure can improve the dark area in a hole-in-display type having the camera hole in the display unit, thereby enhancing the visibility.

15 Claims, 12 Drawing Sheets

DISPLAY DEVICE

CROSS-REFERENCE TO RELATED APPLICATIONS

This application claims priority to Republic of Korea Patent Application No. 10-2018-0164343, filed on Dec. 18, 2018 and Republic of Korea Patent Application No. 10-2019-0108292 filed on Sep. 2, 2019, each of which is incorporated herein by reference in its entirety.

BACKGROUND

Field of the Disclosure

The present disclosure relates to a display device, and more particularly, to a display device of a hole-in-display type having a camera hole in a display.

Description of the Related Art

As mobile devices such as smart phones, pads, and notebooks evolve, the demand for displays is gradually increasing. In recent years, it is moving toward a full-screen display that covers the front surface and increases the sense of immersion in order to benefit from the size and design of the mobile device.

For example, if only a camera hole is on the front display and the remainder is hidden, the front display can have a simple shape. When the front display becomes simple, the non-screen region is reduced, such that the sense of immersion is enhanced when viewing the image, etc.

SUMMARY

An object of the present disclosure is to provide a display device, which improves a dark area, thereby being visually recognized brightly and uniformly and having the excellent display quality in a display device of a hole-in-display type having a camera hole in a display.

According to the feature of the present disclosure for achieving the object, the present disclosure includes a backlight unit having a camera hole therein and a dark-area improvement means provided in the backlight unit and for providing light to a dark-area generation region of the back side of the camera hole corresponding to the opposite side where a light source is positioned, thereby improving the dark-area region.

The dark-area improvement means can include a guide panel positioned at the edge of the backlight unit and an optical fiber positioned inside the guide panel and for receiving the light from the light source to emit the light to the dark-area generation region of the back side of the camera hole corresponding to the opposite side where the light source is positioned.

Alternatively, the dark-area improvement means can include a side reflective portion positioned on the back side of the camera hole corresponding to the opposite side where the light source is positioned in the backlight unit and for reflecting a part of the light entering both sides of the camera hole to condense the light to the dark-area generation region of the back side of the camera hole.

Alternatively, the dark-area improvement means can be provided in the liquid crystal panel. That is, the dark-area improvement means can control driving of at least one of a plurality of sub-pixels in the liquid crystal panel positioned on the upper portion of the backlight unit, thereby improving the dark-area region of the back side of the camera hole corresponding to the opposite side where the light source is positioned.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION

Hereinafter, embodiments of the present disclosure will be described in detail with reference to the accompanying drawings.

Figure 1:
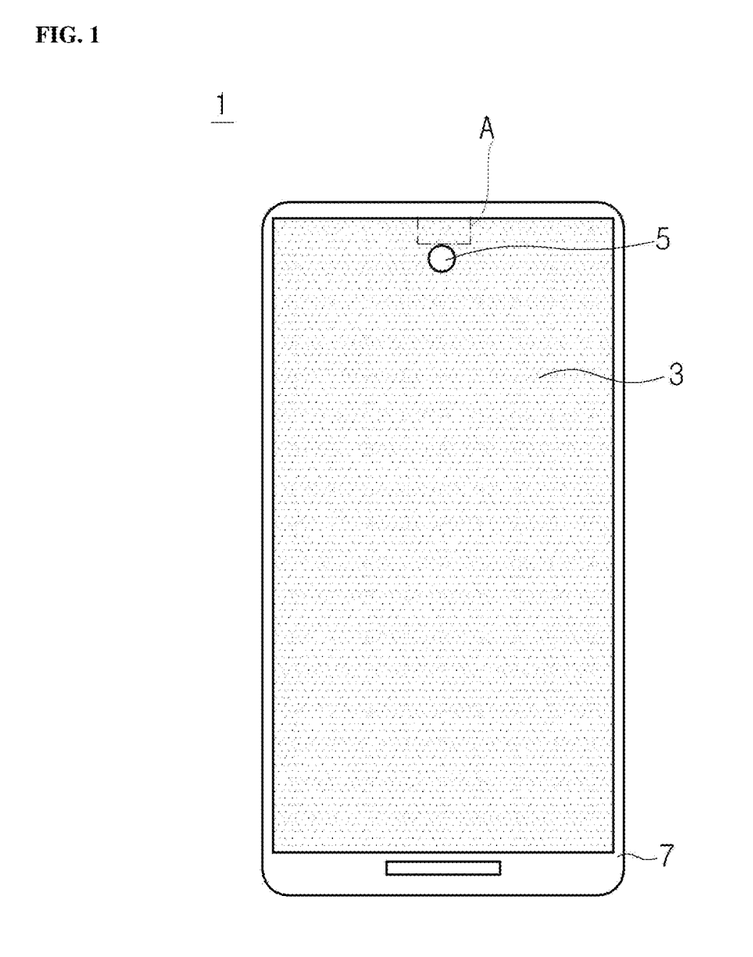
FIG. 1 is a front diagram illustrating a display device according to an embodiment of the present disclosure.

As illustrated in FIG. 1, a display device 1 of the present disclosure is a display device of a hole-in-display type having a camera hole 5 in a display unit 3. When the camera hole 5 is provided in the display unit 3, a bezel 7 corresponding to the edge surrounding the display unit 3 can become thin, thereby implementing a simple design and enhancing the sense of immersion when viewing an image, etc.

The camera hole 5 can be provided in the center of the upper portion or one side of the upper portion of the display unit 3.

The display device 1 includes a liquid crystal panel and a backlight unit. The liquid crystal panel functions by using the light received from outside the display device 1 and the backlight unit supplies light to the liquid crystal panel. That is, a backlight unit 10 uniformly supplies light to the liquid crystal panel so that an image can be visually seen on the display unit 3.

Figure 2:
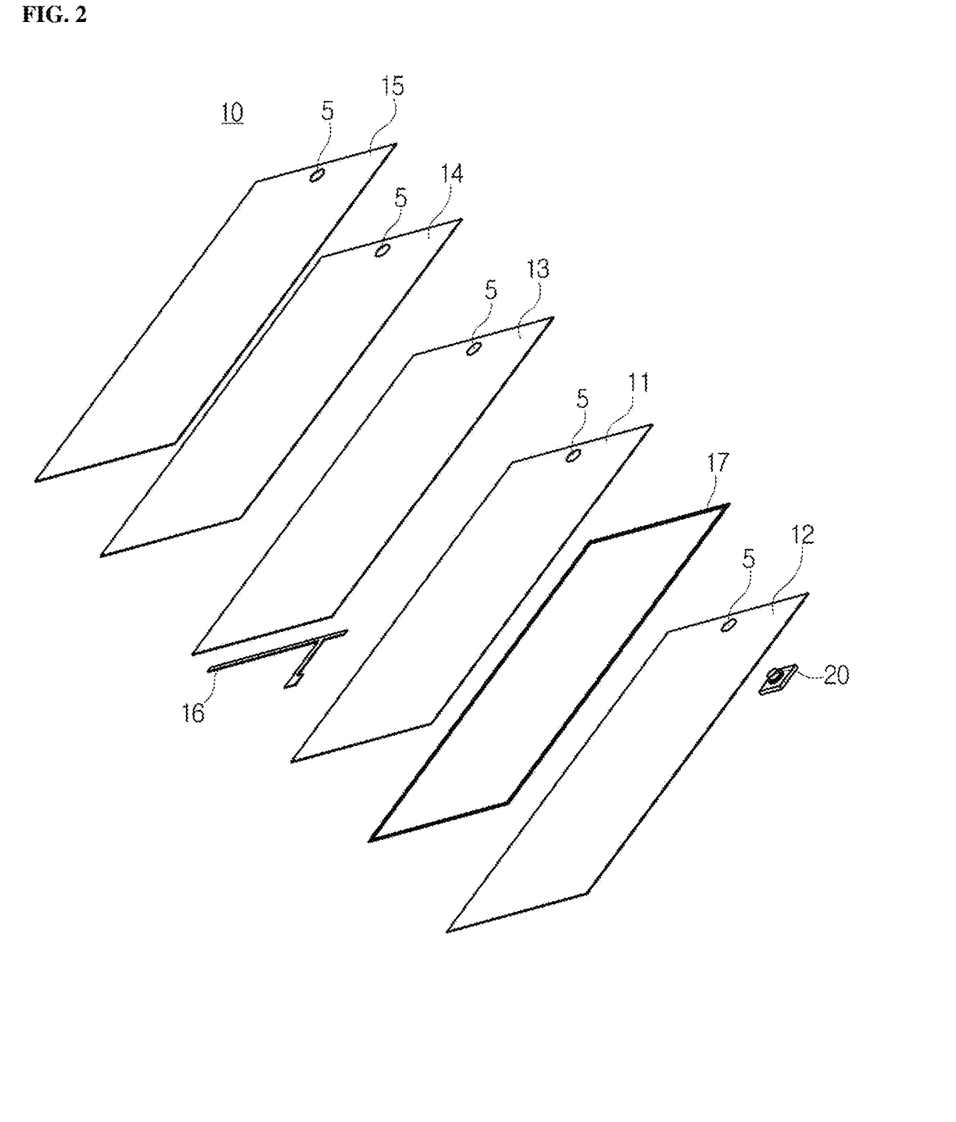
FIG. 2 is a perspective diagram illustrating a backlight unit of the display device according to an embodiment of the present disclosure.

As illustrated in FIG. 2, the camera hole 5 is formed in the backlight unit 10. The camera hole 5 is formed in the backlight unit 10 for implementing a hole-in-display type display device.

The backlight unit 10 includes a light guide plate 11 and a light source 16. The light guide plate 11 uniformly disperses the light received from the light source 16 positioned on the side surface or the lower end thereof to the desired area. The light guide plate 11 can be made of polymethyl methacrylate resin (PMMA). The light guide plate 11 can form an uneven pattern for reflecting the light in a specific direction formed on the bottom surface thereof or can form the V-cutting to enhance the straightness of the light.

The light source 16 may comprise an LED. In an embodiment, the light source 16 comprises an LED array at the lower end of the light guide plate 11.

A reflective sheet 12 is positioned on the bottom surface of the light guide plate 11 so that the light is irregularly reflected and is emitted to the front surface of the light guide plate 11. The reflective sheet 12 allows more light to be transmitted to the liquid crystal panel.

A diffusing sheet 13, a prism sheet 14, and a protective sheet 15 for adjusting the light path are positioned on the upper surface of the light guide plate 11 so that the light passing through the light guide plate 11 is received in the liquid crystal panel without loss. The diffusing sheet 13, the prism sheet 14, and the protective sheet 15 perform diffusing, condensing, and protecting functions of the light passing through the light guide plate 11 to adjust it to uniform light having a specific direction required for the liquid crystal panel.

The backlight unit 10 further includes a guide panel 17 positioned between the light guide plate 11 and the reflective sheet 12. The guide panel 17 is attached to the reflective sheet 12, functions as an edge for supporting the light guide plate 11, and can be laminated when the liquid crystal panel is seated in the backlight unit 10.

The camera hole 5 is formed by passing through the reflective sheet 12, the light guide plate 11, the diffusing sheet 13, the prism sheet 14, and the protective sheet 15, and a camera lens 20 is mounted in the camera hole 5.

Figure 3A:
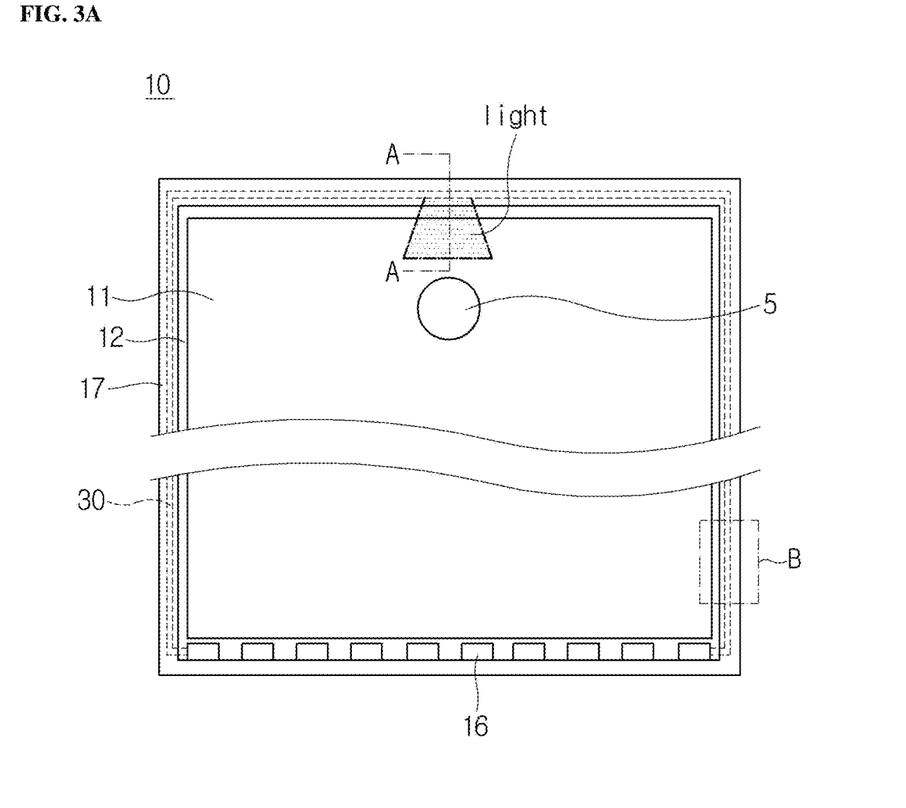
FIG. 3A is a plane diagram illustrating a structure of an embodiment applying an optical fiber to the backlight unit of FIG. 2 according to an embodiment of the present disclosure.

As illustrated in FIG. 3A, the backlight unit 10 includes an optical fiber 30. The optical fiber 30 functions as a dark-area improvement means for improving the dark-area generation region of the back side of the camera hole 5. That is, the optical fiber 30 emits light to the dark-area generation region of the back side of the camera hole 5 corresponding to the opposite side where the light source 16 is positioned, thereby improving the dark area.

When the camera hole 5 is formed in the display unit 3, light does not reach the back side (the portion A in FIG. 1) of the camera hole 5, thereby generating a dark area. This is caused by the straightness of an LED light source path, and is because the light going straight from the light source 16 is blocked by the camera hole 5 and cannot reach the back side of the camera hole 5.

Figure 4:
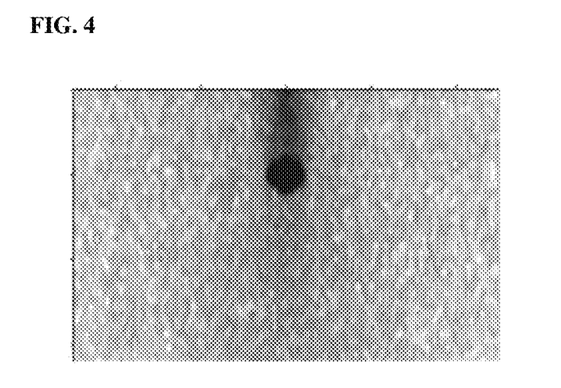
FIG. 4 is a diagram illustrating the light profile in a light guide plate that measured the case where a dark area occurred at the back side of a camera hole.

The dark area is generated on the back side of the camera hole 5 corresponding to the portion A of FIG. 1, and when the light profile in the light guide plate is measured, the dark area is generated on the back side of the camera hole as illustrated in FIG. 4. In the case of FIG. 4, although some improvement is possible by adjusting the pattern of the light guide plate 11, the dark-area region is still generated. When the dark area is generated, the visibility of the display unit is reduced and the display quality is reduced. In order to solve this, the backlight unit 10 includes the optical fiber 30 for improving the dark area.

As illustrated in FIG. 3A, the optical fiber 30 is positioned inside the guide panel 17 functioning as the edge of the light guide plate 11. The optical fiber 30 is positioned inside the guide panel 17 along the longitudinal direction thereof and both ends thereof contact the light source 16. The guide panel 17 is formed with an opening portion 18 at a position corresponding to the back side of the camera hole 5 so that the optical fiber 30 is exposed toward the light guide plate 11.

The side core portion of the optical fiber 30 is exposed in the opening portion 18 toward the light guide plate 11. The core portion must be exposed in the opening portion 18, because the optical fiber 30 emits light through the core portion. The core portion is exposed by cutting a part of outer periphery of the optical fiber 30 corresponding to the opening portion 18, but the method is not limited thereto. A concave-convex pattern is formed on the side core portion exposed through the opening portion 18. The concave-convex pattern imparts irregular reflection and scattering effect to the inside of the optical fiber, so that light is emitted without causing total internal reflection in the core portion corresponding to the opening portion 18. The concavo-convex pattern may be a prism shape or a random concavo-convex shape. The optical fiber 30 receives the light from the light source 16 at both ends contacting the light source 16, and transfers the light so that the portion exposed through the opening portion 18 emits the light to the dark-area generation region of the back side of the camera hole 5. The light emitted to the dark-area generation region improves the dark area of the back side of the camera hole 5.

The light totally reflected in the optical fiber 30 is emitted to the opening portion 18.

Figure 5A:
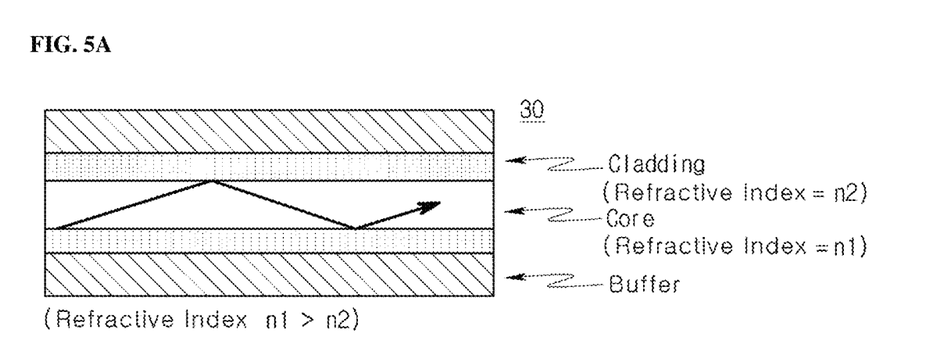
FIG. 5A is a diagram for explaining a structure and a principle of the optical fiber according to an embodiment of the present disclosure.

As illustrated in FIG. 5A, the optical fiber 30 transfers the light from one side to the other side opposite thereto through the total internal reflection. Although the optical fiber is bent, the light is reflected along the inner wall surface through the internal total reflection to advance, such that the light loss is close to zero.

The optical fiber has a structure including a core, a cladding, and a buffer. The diameter of the core can be a range of 5 μm to 15 μm or 40 μm to 100 μm, the thickness of the cladding can be a range of 125 μm to 140 μm, and the thickness of the buffer can be a range of 250 μm to 900 μm. Material of the core is different from material of the cladding of the optical fiber, thus a total reflection may occur between the core and the cladding of the optical fiber due to the refractive index difference. For example, materials of the core and the cladding of the optical fiber can contain one or more components selected from the group consisting of silica glass, multicomponent-glass, acryl, and polymethyl methacrylate (PMMA). A material of the buffer of the optical fiber can contain one or more components selected from the group consisting of silicone resin, epoxy acrylate, urethane, and ethylene-vinyl acetate copolymer (EVA).

Figure 3B:
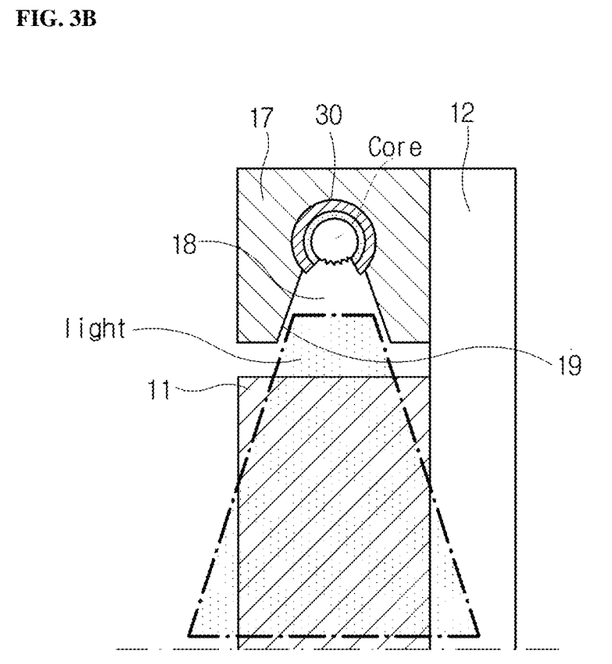
FIG. 3B is a cross-sectional diagram illustrating the portion A-A of FIG. 3A according to an embodiment of the present disclosure.
Figure 5B:
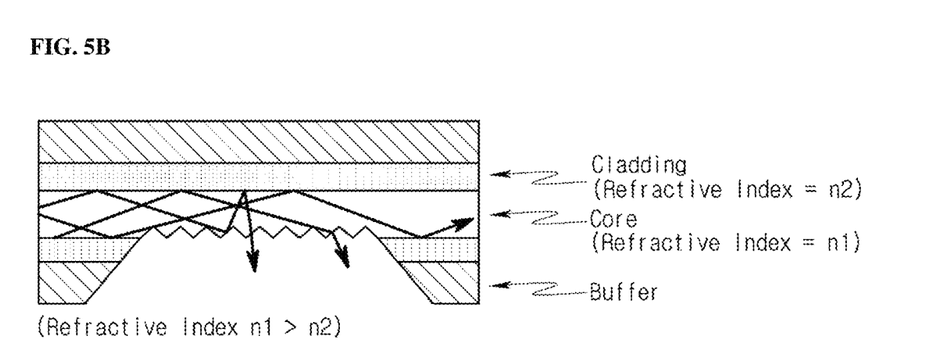
FIG. 5B is a diagram for explaining the principle of light emission in the structure of FIG. 3B according to an embodiment of the present disclosure.

As illustrated in FIG. 3B, which is a cross-section taken along line A-A of FIG. 3A, the outer periphery of the optical fiber 30 is exposed toward the light guide plate 11 through the opening portion 18 of the guide panel 17. The opening portion 18 has a slope 19 that is inclined outwardly toward the outlet side thereof so that the light is emitted to a wider area. As illustrated in FIG. 5A, in the optical fiber 30, the refractive index of the core is larger than the refractive index of the cladding. Therefore, when the light moves from the core to the cladding, the incidence angle is larger than the critical angle, so that the light is not refracted, and the total reflection occurs. Therefore, even if the core portion is exposed to the opening portion, light is not emitted because the refractive index of the core is still larger than the refractive index of the air. Therefore, as illustrated in FIG. 5B, a concavo-convex pattern is formed on the core portion corresponding to the opening portion to impart irregular reflection and scattering effect to the inside of the optical fiber, thereby changing the light reflection angle so that light can be emitted from the core having a high refractive index to air having a relatively low refractive index.

Meanwhile, as illustrated in FIG. 3B, which is a cross-section taken along line A-A of FIG. 3A, in one embodiment the length of the opening portion 18 corresponds to the diameter of the camera hole 5 or is relatively long so that sufficient light is emitted to the dark-area region. Although it has been described in an embodiment that the opening portion 18 is formed with one at a position corresponding to the back side of the camera hole 5, it can also be formed in plural at certain intervals in order to improve the dark area.

Figure 3C:
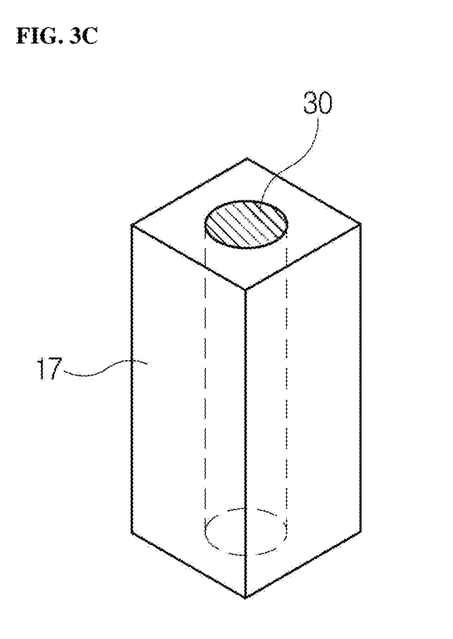
FIG. 3C is a cross-sectional diagram illustrating the portion B of FIG. 3A according to an embodiment of the present disclosure.

As illustrated in FIG. 3C, the optical fiber 30 can be inserted into the guide panel 17 by injection at the time of manufacturing the guide panel 17. When the optical fiber 30 is integrally manufactured with the guide panel 17, the alignment, etc. are facilitated at the time of manufacturing the backlight unit 10.

In another example, the optical fiber 30 can be positioned inside the light guide plate 11 by inserting the optical fiber into the light guide plate 11 at the time of injecting the light guide plate 11 without inserting into the guide panel 17. Alternatively, the optical fiber 30 can also be positioned in a space between the guide panel 17 and the light guide plate 11.

Figure 6A:
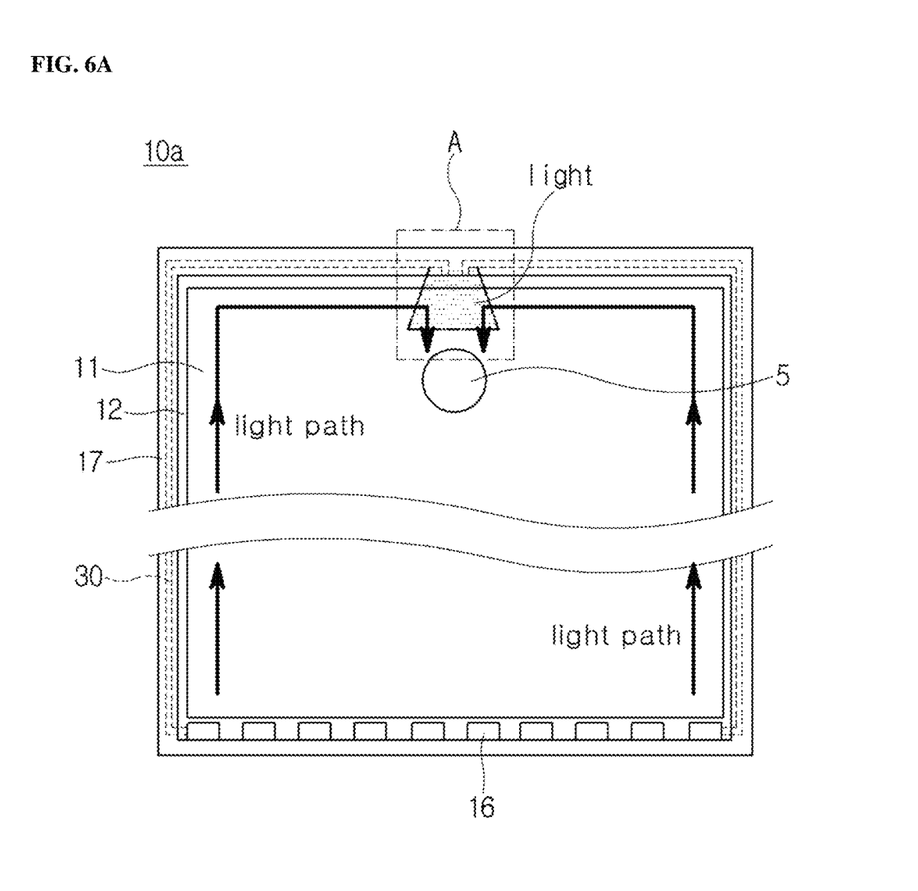
FIG. 6A is a plane diagram illustrating a structure of another embodiment applying the optical fiber to the backlight unit of FIG. 2 according to an embodiment of the present disclosure.

In another embodiment, as illustrated in FIG. 6A, the optical fiber 30 can be separated into two positioned inside the guide panel 17 functioning as the edge of the light guide plate 11. The optical fiber 30 can be positioned inside the guide panel 17 so that both ends thereof contact the light source 16, and can be separated in an opening portion 18a and the end portions 31a, 31b of the separated optical fibers 30a, 30b face the camera hole 5.

Figure 6B:
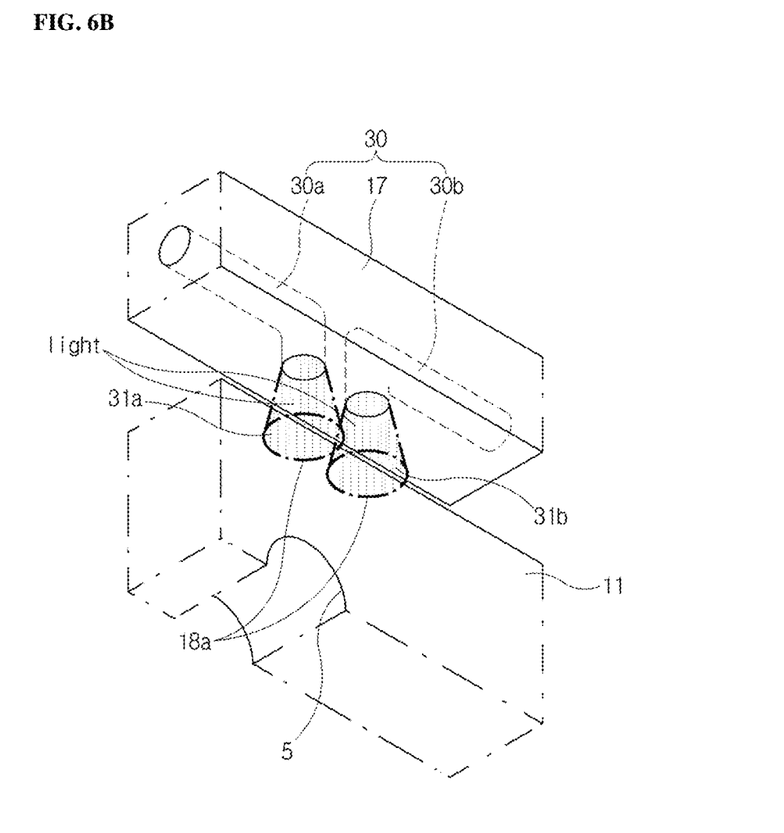
FIG. 6B is an enlarged configuration diagram illustrating the portion A of FIG. 6A according to an embodiment of the present disclosure.

As illustrated in FIG. 6B, the opening portion 18a can be formed to have the size corresponding to the end portions 31a, 31b of the optical fibers 30a, 30b. In an embodiment, two opening portions 18a are formed in the guide panel 17, and the light is emitted from the end portions 31a, 31b of the optical fibers 30a, 30b positioned in the two opening portions 18a to the dark-area region of the back side of the camera hole 5. The two opening portions 18a are adjacent to each other so that the light partially overlaps when the light is emitted, such that the light uniformly reaches the entire dark-area region.

Specifically, the light from the light source 16 can be received at both ends of the optical fiber 30 contacting the light source 16, the light can be moved to the respective end portions 31a, 31b of the optical fibers 30a, 30b positioned in the opening portion 18a, and the light can be emitted in the opening portion 18a. When the light is emitted to the dark-area region through the respective end portions 31a, 31b of the optical fibers 30a, 30b, the light emission efficiency is more excellent than the case that the light is emitted through the outer periphery of the optical fiber 30 in an embodiment, thereby enhancing the dark-area improvement effect.

The optical fiber 30 can be inserted into the guide panel 17 by injection at the time of manufacturing the guide panel 17. When the optical fiber 30 is integrally manufactured with the guide panel 17, the alignment, etc. are facilitated at the time of manufacturing the backlight unit 10.

The guide panel 17 can also be positioned at the edge of the light guide plate 11 by injection with one mold so that the optical fiber 30 is embedded therein, and also be positioned at the edge of the light guide plate 11 by injection with two molds so that the optical fibers 30a, 30b are embedded therein, respectively.

Figure 7A:
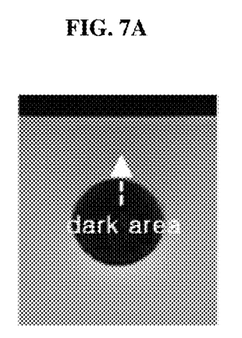
FIGS. 7A, 7B, and 7C are diagrams illustrating the photographs that compared the dark areas before and after the optical fiber was applied to the backlight unit according to an embodiment of the present disclosure.
Figure 7B:
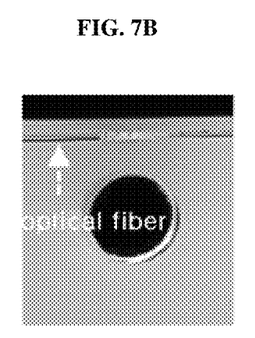
Figure 7C:
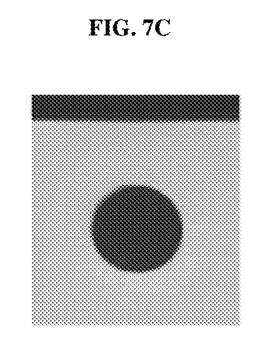

FIGS. 7A, 7B, and 7C are diagrams illustrating the photographs that compared the dark areas before and after the optical fiber was applied to the backlight unit.

As illustrated in FIG. 7, FIG. 7A is a diagram illustrating before the optical fiber was applied, and it is confirmed that when the camera hole is formed in the display unit, the light does not reach the back side of the camera hole, thereby generating the dark area. FIG. 7B is a diagram illustrating that the optical fiber was applied to the backlight unit. FIG. 7C is a diagram illustrating after the optical fiber was applied as in FIG. 7B, and it is confirmed that the bright and uniform visibility was secured even when the camera hole was formed in the display unit. Therefore, it can be confirmed that the optical fiber transfers the light to the dark area of the back side of the camera hole, thereby improving the dark area.

Figure 8:
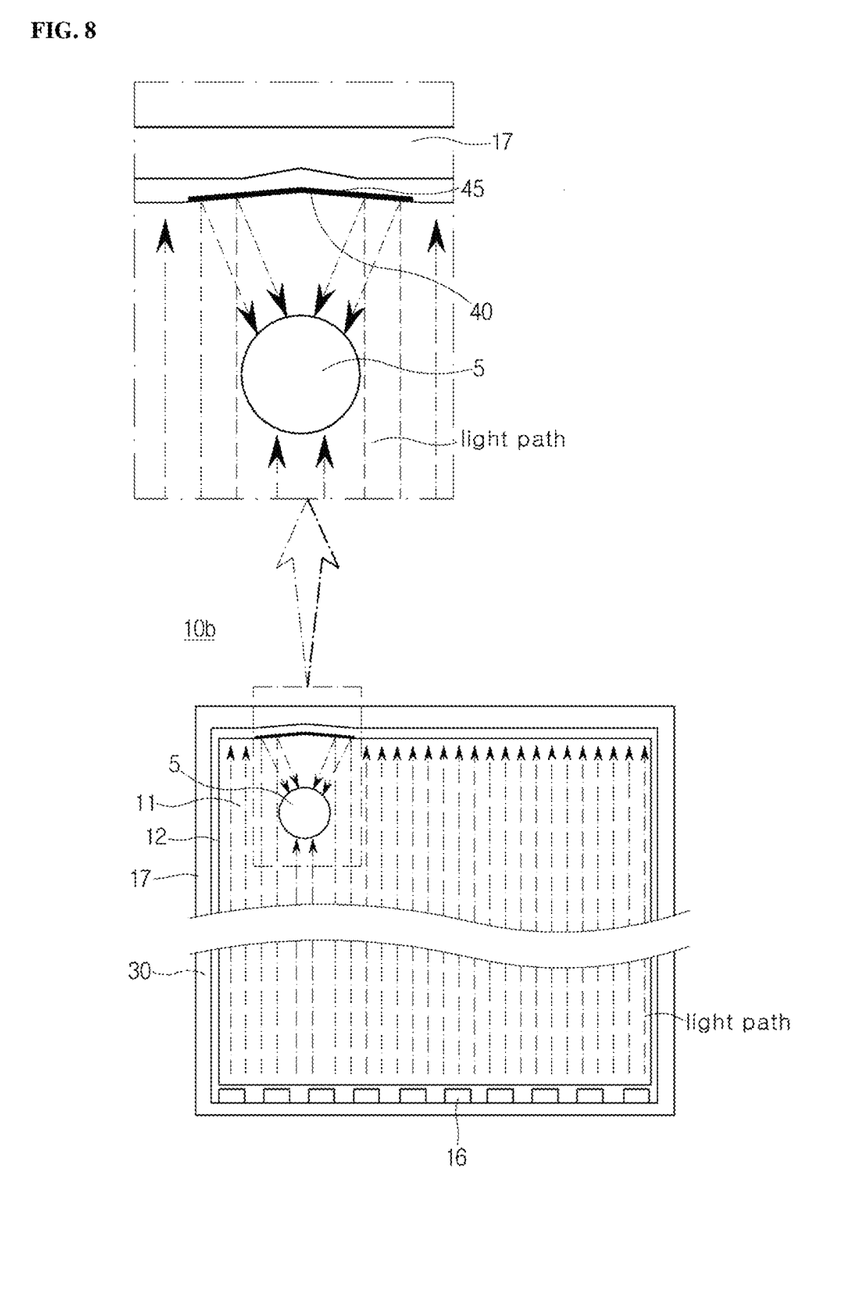
FIG. 8 is a plane diagram illustrating the backlight unit of the display device according to still another embodiment of the present disclosure.

In still another embodiment, as illustrated in FIG. 8, a backlight unit 10b can include a side reflective portion 40 for reflecting a part of the light passing both sides of the camera hole 5 to condense the light to the dark-area generation region of the back side of the camera hole 5. The side reflective portion 40 functions as a dark-area improvement means for improving the dark-area generation region of the back side of the camera hole 5. That is, the side reflective portion 40 reflects the light from the light source 16 to the back side of the camera hole 5, thereby improving the dark-area region.

The side reflective portion 40 can be formed to have a '/\' shape so that the light passing both sides of the camera hole 5 can be reflected and condensed to the back side of the camera hole 5. The '/\' shape maximizes the light reflection efficiency by the condensing function toward the back side of the camera hole 5. The '/\' shape forms an angle by connecting the end of the one inclined surface with the other inclined surface.

Specifically, the backlight unit 10b includes the light guide plate 11 and the reflective sheet 12 positioned on the back surface of the light guide plate 11, and the side reflective portion 40 can be formed so that the portion facing the back side of the camera hole 5 in the light guide plate 11 is formed to have a 'Δ' shape. The 'Δ' shape includes two inclined surfaces, and the ends of the two inclined surfaces are connected to each other to form an angle, and the two inclined surfaces are connected to each other through one side.

The light source 16 is positioned at the lower end of the light guide plate 11 in the form of an LED array and irradiates the light toward the upper portion of the light guide plate 11. The light going straight due to the straightness of light path of the LED light source is blocked by the camera hole 5 and does not reach the back side of the camera hole 5. However, the portion facing the back side of the camera hole 5 in the light guide plate 11 can be formed to have the '/\' shape or the 'Δ' shape, and the light passing both sides of the camera hole 5 can be reflected from the '/\' shape or the 'Δ' shape to be condensed to the back side of the camera hole 5.

The '/\' shape or the 'Δ' shape of the side reflective portion 40 in the light guide plate 11 is formed to have the width and the angle at which the light passing both sides of the camera hole 5 can reach the side reflective portion 40. For example, it is preferable that the width of the '/\' shape or the 'Δ' shape of the side reflective portion 40 in the light guide plate 11 is relatively longer than the diameter of the camera hole 5.

In an embodiment, the camera hole 5 is provided at the upper portion of the display unit 3, and the side reflective portion 40 further forms the Δ shape at a position on the upper end of the light guide plate 11 corresponding to the back side of the camera hole 5, but when the camera hole 5 is provided in the center of the upper portion of the display unit 3, the 'Δ' shape can be further formed at the center of the upper end of the light guide plate 11 so that the position of the side reflective portion 40 also corresponds thereto.

An auxiliary side reflective portion 45 provided at both hillsides of the triangular hill of the 'Δ' shape of the side reflective portion 40 and for enhancing the light reflection efficiency of the side reflective portion 40 can be included therein.

The auxiliary side reflective portion 45 can be formed by attaching reflective plates to both hillsides of the side reflective portion 40 of the light guide plate 11, or further adding reflective plates to the reflective sheet 12 positioned on the back surface of the light guide plate 11 corresponding to both hillsides of the side reflective portion 40 of the light guide plate 11.

Figure 9:
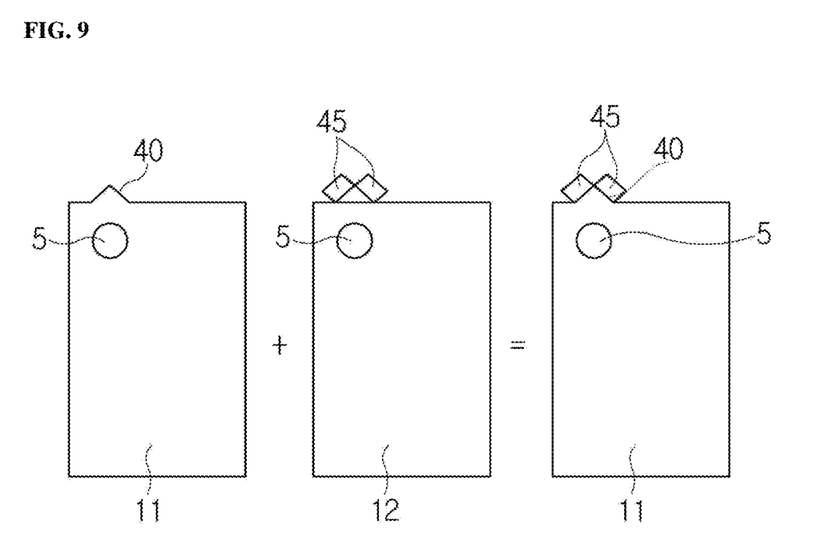
FIG. 9 is a plane diagram illustrating a light guide plate and a reflective sheet of FIG. 8 according to an embodiment of the present disclosure.

In an embodiment, as illustrated in FIG. 9, the light guide plate 11 forms the side reflective portion 40 of the Δ shape at a position of the upper end thereof corresponding to the back side of the camera hole 5, and the reflective sheet 12 forms the auxiliary side reflective portion 45 corresponding to both hillsides of the side reflective portion 40 of the light guide plate 11. Therefore, when the reflective sheet 12 is positioned on the back surface of the light guide plate 11, the auxiliary side reflective portion 45 is stacked on the side reflective portion 40. The side reflective portion 40 and the auxiliary side reflective portion 45 can enhance the light reflection efficiency of the LED light source, thereby improving the dark-area region of the back side of the camera hole 5.

Figure 10:
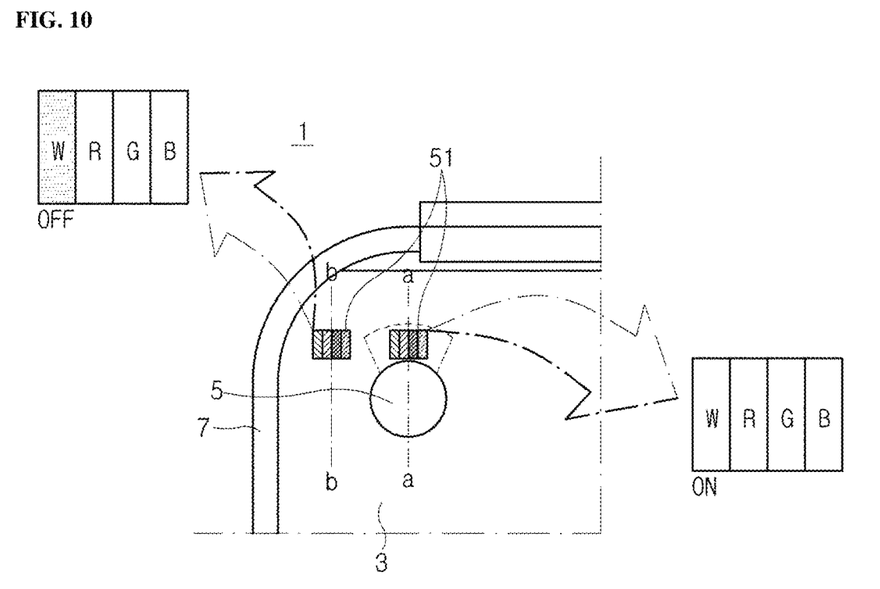
FIG. 10 is a plane diagram illustrating the display device according to yet another embodiment of the present disclosure.
Figure 11:
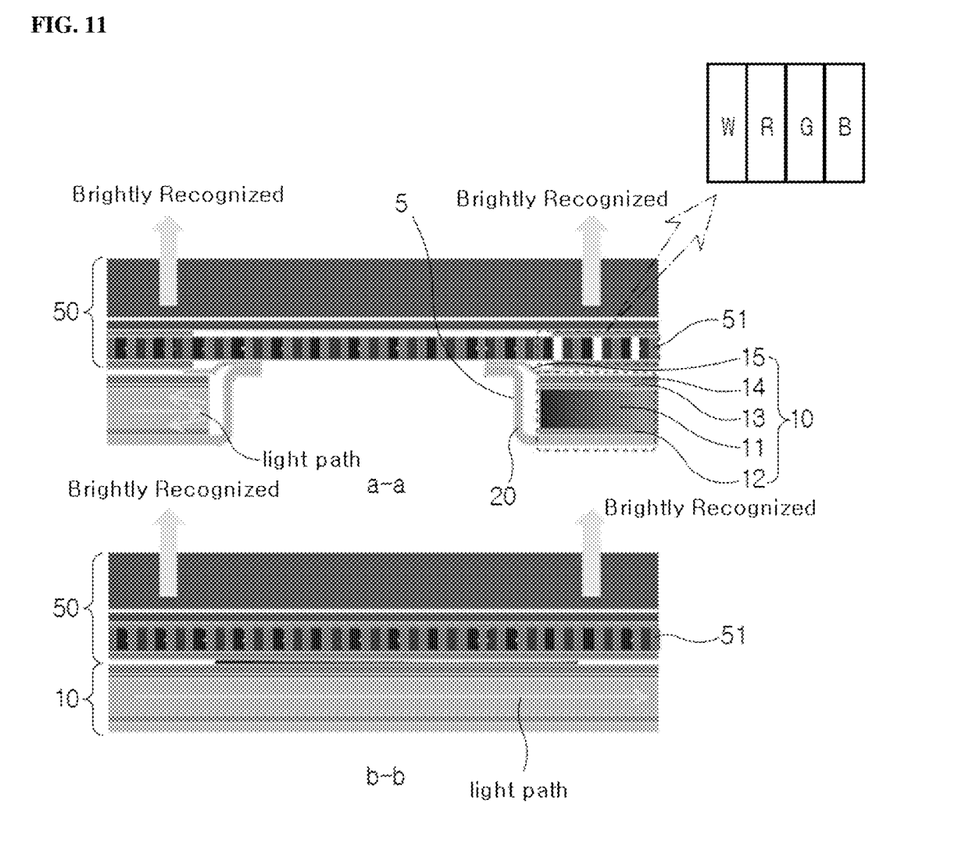
FIG. 11 is a cross-sectional diagram illustrating the portion a-a and the portion b-b of FIG. 10 according to an embodiment of the present disclosure.

In another embodiment, as illustrated in FIG. 10 and FIG. 11, the display device 1 can control driving of the white sub-pixel (W) of a color filter substrate 51 included in a liquid crystal panel 50, thereby improving the dark-area region of the back side of the camera hole 5 provided in the display unit 3.

Specifically, the display device 1 can have the camera hole 5 formed in the backlight unit 10, and can control driving of the white sub-pixel of the liquid crystal panel 50 positioned on the upper portion of the backlight unit 10, thereby improving the dark-area generation region of the back side of the camera hole 5.

The dark-area generation region of the back side of the camera hole 5 can have the white sub-pixel turned on (ON), and the remaining region can have the white sub-pixel turned off (OFF), thereby minimizing the relative contrast and improving the dark-area generation region of the back side of the camera hole 5.

The liquid crystal panel 50 includes a transistor (TFT), a pixel electrode, a liquid crystal, a common electrode, a color filter substrate 51, and a polarizer. The liquid crystal controls the amount of transmitted light that is emitted from the backlight unit 10 by the electric field between the pixel electrode and the common electrode controlled by the thin film transistor (TFT).

A common voltage entirely common to the display unit 3 is applied to the common electrode, and a data voltage necessary for each pixel electrode is individually applied to the pixel electrode through a data line. In addition, the display unit 3 includes a plurality of sub-pixels. The plurality of sub-pixels can include a red sub-pixel, a green sub-pixel, a blue sub-pixel, and a white sub-pixel. In addition, each sub-pixel includes the color filter substrate 51 for a color control of the light transmitted through the corresponding sub-pixel region. The color filter substrate 51 can include a red (R) color filter, a green (G) color filter, a blue (B) color filter, and a white (W) color filter. At this time, the white sub-pixel can include a white (W) color filter or be implemented by a method that does not include a separate color filter.

Driving of the white sub-pixel can be performed by applying a voltage corresponding to the pixel electrode of the white sub-pixel. Specifically, the driving of the white sub-pixel can be implemented by controlling the thin film transistor (TFT) corresponding to the white sub-pixel to apply the voltage corresponding to the pixel electrode of the white sub-pixel to form an electric field between the pixel electrode and the common electrode, and thereby controlling an operation of the liquid crystal to control the amount of the transmitted light corresponding to the white sub-pixel (W).

As illustrated in FIG. 11, the light going straight from the light source 16 is blocked by the camera hole 5 and does not reach the back side of the camera hole 5, thereby generating the dark area.

Therefore, the white sub-pixel can be turned on (ON) in the dark-area region of the back side of the camera hole 5, thereby being brightly recognized, and the white sub-pixel can be turned off (OFF) in the remaining region, thereby reducing the contrast between the dark-area region and the remaining region and having the uniform visibility.

That is, the driving of the white sub-pixel (W) in the liquid crystal panel 50 can be controlled to express the dark area more brightly and clearly than the other areas, thereby improving the contrast between the dark area and the area without the dark area.

Then, in the region where the light goes straight, the white sub-pixel is turned off (OFF) so that the entire visibility is uniform.

Alternatively, in still another embodiment of the present disclosure, driving of a red sub-pixel or a green sub-pixel or a blue sub-pixel or a white sub-pixel or any two or more of them in the plurality of sub-pixels in the display unit can be controlled to increase the brightness of the dark-area region of the back side of the camera hole, thereby minimizing the contrast relative to the other regions and improving the dark area. That is, it can be implemented by controlling the liquid crystal of the plurality of sub-pixels so that the amount of the transmitted light of the plurality of sub-pixels positioned in the dark-area region is more increased. For example, the data voltage applied to the plurality of sub-pixels positioned in the dark-area region can be greatly increased so that the brighter image is displayed unlike the other regions, thereby improving the brightness of the dark-area region.

Hereinafter, an operation of the present disclosure will be described.

The display device of the present disclosure is configured to transfer the light to the dark-area generation region of the back side of the camera hole into which the camera is inserted, thereby improving the dark area.

That is, in an embodiment, as illustrated in FIGS. 3A and 3B, the present disclosure is configured so that the optical fiber 30 is positioned inside the guide panel 17 and the optical fiber 30 receives the light from the light source 16 and emits the light to the dark-area generation region of the back side of the camera hole 5 corresponding to the opposite side on which the light source 16 is positioned.

The optical fiber 30 can transfer the light from the light source 16 to the dark-area region by using the total reflection principle, thereby improving the dark area and providing uniform visibility on the entire surface of the display unit 3.

At this time, since the optical fiber 30 is integrally embedded in the guide panel 17 by injection, the alignment can be facilitated at the time of manufacturing the backlight unit 10.

Alternatively, in another embodiment, as illustrated in FIGS. 6A and 6B, the present disclosure can be configured so that the end portions 31a, 31b of the optical fiber 30 emit the light to the dark-area generation region of the back side of the camera hole 5, thereby maximizing the dark-area improvement effect.

Alternatively, in still another embodiment, as illustrated in FIG. 8, the present disclosure can be configured so that a part of the light entering both sides of the camera hole 5 is reflected to condense the light to the dark-area generation region of the back side of the camera hole 5, thereby improving the dark area.

Alternatively, in yet another embodiment, as illustrated in FIG. 10, the present disclosure can control the driving of the white sub-pixel (W) in the liquid crystal panel 50 positioned on the upper portion of the backlight unit 10, thereby minimizing the relative contrast between the dark-area region and the remaining region of the back side of the camera hole 5 and improving the dark area.

Accordingly, the present disclosure can provide the excellent display quality and provide the high-quality image while implementing the display device of the Hole In Display type where the position of the camera is positioned within the display unit.

The above-described present disclosure is applicable in combination of some or all of an embodiment, another embodiment, and still another embodiment.

In addition, the display device of the present disclosure is applicable not only to a mobile display but also to an LCD TV, a navigation system, a DMB, a monitor, etc.

The present disclosure transfers the light from the LED light source to the dark-area region of the back side of the camera hole by using the total reflection principle of the optical fiber, thereby improving the dark area, reflects a part of the light entering both sides of the camera hole to condense the light to the dark-area generation region of the back side of the camera hole, thereby improving the dark area, or controls the driving of the white sub-pixel (W) in the liquid crystal panel, thereby minimizing the relative contrast between the dark-area region and the remaining region of the back side of the camera hole, thereby improving the dark area.

Therefore, the present disclosure can provide the uniform and bright visibility by improving the dark area even while implementing the display device of the Hole In Display type where the position of the camera is positioned in the display unit, thereby providing the display device having the excellent display quality.

The present disclosure has disclosed the best modes in the drawings and the specification. Although specific terms have been used herein, they are only used for the purpose of describing the present disclosure and are not used to limit the meaning or restrict the scope of the present disclosure described in the claims. Therefore, it will be understood by those skilled in the art that various modifications and other embodiments equivalent thereto can be made therefrom. Therefore, the true technical scope of the present disclosure should be determined by the technical spirit of the appended claims.

What is claimed is:

1. A display device, comprising a liquid crystal panel, a backlight unit, and a camera hole, wherein,
   the backlight unit comprises: a light guide plate, disposed on a backside of the liquid crystal panel, a light source, disposed on a side of the light guide plate of the display device;
   wherein a camera hole is disposed at a position on the light guide plate,
   wherein the display device further comprises a dark area improvement means, supplying light to a dark area generation region, which is located adjacent to backside of the camera hole.

2. The display device of claim 1, further comprising a guide panel,
   wherein the dark area improvement means comprises an optical fiber, disposed in the guide panel of the backlight unit, the optical fiber connected to the light source, an opening portion exposing a part of the optical fiber towards the dark area generation region is located at a side of the guide panel opposite to the position of the light source.

3. The display device of claim 2, wherein,
   the opening portion has an inclined surface inclined upwards towards an outlet thereof.

4. The display device of claim 1, wherein,
   the dark area improvement means comprises more than one optical fiber, disposed along a periphery of the backlight unit, one end thereof is connected to the light source, and another end thereof is disposed at a position adjacent to or in the dark area generation region.

5. The display device of claim 4, wherein,
   the backlight unit further comprises a guide panel disposed around the periphery of the light guide plate, and the optical fiber is disposed in the guide panel.

6. The display device of claim 5, wherein,
   more than one opening portion expose the other end of the optical fiber are disposed at a position adjacent to the dark area generation region.

7. The display device of claim 1, wherein,
   the dark area improvement means comprises a side reflective portion disposed on the side of the light guide plate, the side reflective portion reflects the light transmitted in the light guide plate towards the dark area generation region.

8. The display device of claim 7, wherein,
   the side reflective portion comprises at least two inclined surfaces and the end of the two inclined surfaces are connected to each other to form an angle.

9. The display device of claim 8, wherein,
the dark area improvement means further comprises a reflective sheet and an auxiliary side reflective portion disposed on the reflective sheet, and located on the side reflective portion.

10. The display device of claim 1, wherein,
the dark area improvement means comprises a portion protruded from the side of the light guide plate, the portion reflects the light transmitted in the light guide plate towards the dark area generation region.

11. The display device of claim 10, wherein,
the portion comprises at least two inclined surfaces and the end of the two inclined surfaces are connected to each other to form an angle.

12. The display device of claim 10, wherein,
the dark area improvement means further comprises a reflective sheet and an auxiliary side reflective portion disposed on the reflective sheet, and located on the portion.

13. The display device of claim 1, wherein,
the liquid crystal panel comprises a plurality of sub-pixels,
the dark area improvement means comprises more than one sub-pixel of the liquid crystal panel disposed in the dark area generation region, which emits brighter light than subpixels located in a region other than the dark area generation region.

14. The display device of claim 13, wherein,
the sub-pixels in the liquid crystal panel comprise white sub-pixels, and the white sub-pixels in the more than one sub-pixel in the dark area generation region are constantly turned on, and the white sub-pixels of the sub-pixels in the sub-pixels in the region other than the dark area generation region are constantly turned off.

15. The display device of claim 13, wherein,
a voltage applied to the more than one sub-pixels in the dark area generation region is constantly larger than a voltage applied to the sub-pixels in the region other than the dark area generation region.

* * * * *